United States Patent
Baddeley

(10) Patent No.: US 12,425,920 B2
(45) Date of Patent: Sep. 23, 2025

(54) SYSTEM FOR SUPPORTING HIGH-THROUGHPUT AND/OR HIGH-RELIABILITY IN CONCURRENT TRANSMISSION-BASED NETWORKS

(71) Applicant: Technology Innovation Institute-Sole Proprietorship LLC, Masdar (AE)

(72) Inventor: Michael Baddeley, Masdar (AE)

(73) Assignee: Technology Innovation Institute—Sole Proprietorship LLC, Masdar (AE)

(*) Notice: Subject to any disclaimer, the term of this patent is extended or adjusted under 35 U.S.C. 154(b) by 502 days.

(21) Appl. No.: 17/821,385

(22) Filed: Aug. 22, 2022

(65) Prior Publication Data
US 2024/0064569 A1    Feb. 22, 2024

(51) Int. Cl.
*H04W 28/06* (2009.01)
*H04L 45/00* (2022.01)
(Continued)

(52) U.S. Cl.
CPC .......... *H04W 28/065* (2013.01); *H04L 45/32* (2013.01); *H04W 56/001* (2013.01); *H04W 72/0453* (2013.01)

(58) Field of Classification Search
CPC ............. H04W 28/065; H04W 56/001; H04W 72/0453; H04W 72/044; H04L 45/32
See application file for complete search history.

(56) References Cited

U.S. PATENT DOCUMENTS

| | | |
|---|---|---|
| 7,889,707 B2 | 2/2011 | Niu et al. |
| 8,773,969 B1 | 7/2014 | Zhang et al. |

(Continued)

FOREIGN PATENT DOCUMENTS

EP    3982567 A1    4/2022

OTHER PUBLICATIONS

Nahas et al., "Concurrent Transmissions for Multi-Hop Bluetooth 5", International Conference on Embedded Wireless Systems and Networks (EWSN) (Year: 2019).*
(Continued)

*Primary Examiner* — Ayaz R Sheikh
*Assistant Examiner* — Mang Boi Thawng
(74) *Attorney, Agent, or Firm* — DLA PIPER LLP (US)

(57) ABSTRACT

Systems, methods, and computer-readable media for synchronizing and controlling concurrent transmission-based multi-radio devices to support higher throughput or higher reliability communications in a synchronous flooding mesh network. A host device in a wireless communication network can include multiple radio devices, with each radio device part of a concurrent transmission (CT)-based flooding network configured to concurrently transmit data to one or more corresponding receiving radios with corresponding radio nodes of other devices in the wireless communication network. Data packets can either be fragmented via a packet fragmentation process or replicated via a packet replication process to prioritize either throughput or redundancy for data transmission. The host devices in the network can synchronize a time for transmitting data and distributing any of a set of orthogonal radio frequency channels for each CT flooding network in transmitting data.

20 Claims, 13 Drawing Sheets

(51) Int. Cl.
*H04W 56/00* (2009.01)
*H04W 72/0453* (2023.01)

(56) References Cited

U.S. PATENT DOCUMENTS

| | | | |
|---|---|---|---|
| 9,226,270 | B1 | 12/2015 | Zhang et al. |
| 9,854,592 | B2 | 12/2017 | Veyseh et al. |
| 9,941,988 | B1 | 4/2018 | Zhang et al. |
| 10,411,846 | B1 | 9/2019 | Zhang et al. |
| 10,419,143 | B1 | 9/2019 | Zhang et al. |
| 11,218,981 | B2 | 1/2022 | Raza et al. |
| 11,265,119 | B1 | 3/2022 | Zhang et al. |
| 11,469,855 | B2 | 10/2022 | Raza et al. |
| 2006/0085717 | A1 | 4/2006 | Tomaru et al. |
| 2009/0086699 | A1 | 4/2009 | Niu et al. |
| 2015/0288532 | A1 | 10/2015 | Veyseh et al. |
| 2016/0323897 | A1 | 11/2016 | Veyseh et al. |
| 2020/0100196 | A1 | 3/2020 | Raza et al. |
| 2022/0094475 | A1 | 3/2022 | Ohara et al. |
| 2022/0255664 | A1* | 8/2022 | Raza ............ H04L 1/0057 |

OTHER PUBLICATIONS

Yuan et al., "Ripple: High-throughput, Reliable and Energy-efficient Network Flooding in Wireless Sensor Networks", 2015 IEEE 16th International Symposium on A World of Wireless, Mobile and Multimedia Networks (WoWMoM) (Year: 2015).*

Notice of Allowance for AE Application No. P6002103/2023, mailed Oct. 1, 2025, 7 pages.

Baddeley M., et al., "6TiSCH++ with Bluetooth 5 and Concurrent Transmissions," Oct. 19, 2020, 6 pages.

Baddeley M., et al., "The impact of the Physical Layer on the Performance of Concurrent Transmissions," International Conference on Network Protocols (ICNP), Oct. 2022, 12 pages.

International Search Report and Written Opinion for Application No. PCT/IB2023/058343, mailed on Dec. 14, 2023, 11 pages.

Nahas B. A., et al., "BlueFlood: Concurrent Transmissions for Multi-Hop Bluetooth 5—Modeling and Evaluation," ACM Transactions on Internet of Things, vol. 2, Apr. 20, 2021, 30 pages.

Zimmerling M., et al., "Synchronous Transmissions on Low-Power Wireless: A Survey of Communication Protocols and Network Services," ACM Computing Surveys, Jan. 21, 2020, 39 pages.

* cited by examiner

SYSTEM FOR SUPPORTING HIGH-THROUGHPUT AND/OR HIGH-RELIABILITY IN CONCURRENT TRANSMISSION-BASED NETWORKS

TECHNICAL FIELD

This disclosure relates to systems, methods, and computer-readable media for synchronizing and controlling concurrent transmission-based multi-radio devices to support higher throughput or higher reliability communications in a synchronous flooding mesh network.

BACKGROUND

In wireless communication networks, host devices in the network can wirelessly transmit data to a receiving device over a wireless communication channel. For instance, multiple host devices in a network can each include a system on a chip (SoC) radio that is configured to transmit the data to a corresponding radio of a receiving host device.

In many instances, each radio SoC can be part of a concurrent transmission (CT) flooding network. Radios that are part of a CT flooding network can be configured to concurrently transmit data to a receiving radio. The host devices for each radio part of the CT flooding network can specify a frequency channel and synchronize to a known time for concurrently transmitting the data to the receiver.

However, in many cases, CT flooding networks may only be capable of being implemented on frequency demodulated radios. Such techniques may therefore be limited to technologies such as IEEE 802.15.4 and Bluetooth Low Energy (BLE), which provide far lower data rates (i.e., 100s kbps to 2 Mbps) than other radio standards such as Wi-Fi (e.g., up to 100s Mbps in Wi-Fi 6).

SUMMARY

Systems, methods, and computer-readable media for synchronizing and controlling concurrent transmission-based multi-radio devices to support higher throughput or higher reliability communications in a synchronous flooding mesh network. A host device in a wireless communication network can include multiple radio devices, with each radio device part of a concurrent transmission (CT)-based flooding network configured to concurrently transmit data to one or more corresponding receiving radios with corresponding radio nodes of other devices in the wireless communication network.

Data packets can either be fragmented via a packet fragmentation process or replicated via a packet replication process to prioritize either throughput or redundancy for data transmission. For instance, a packet fragmentation process can include fragmenting the data packet and assigning each fragment to be transmitted by radios of each CT flooding network. The receiving radio can obtain each fragment of the data packet and re-create the data packet based on the fragments, thereby increasing a throughput of the transmission of data over the network. The packet replication process can include replicating a data packet for transmission of each replicated instance of the data packet over each CT flooding network, thereby increasing reliability of obtaining the data packet at the receiving radio.

The host devices in the network can synchronize a time for transmitting either all or the fragment of the data packet for each CT flooding network and distributing any of a set of orthogonal radio frequency channels for each CT flooding network in transmitting either all or the fragment of the data packet. Each radio can concurrently transmit all or the fragment of the data packet to corresponding receiving radios at the synchronized time and over the assigned frequency for each CT flooding network.

This Summary is provided to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The above and other aspects of the disclosure, its nature, and various features will become more apparent upon consideration of the following detailed description, taken in conjunction with the accompanying drawings, in which like reference characters may refer to like parts throughout, and in which.

DETAILED DESCRIPTION

Figure 1:
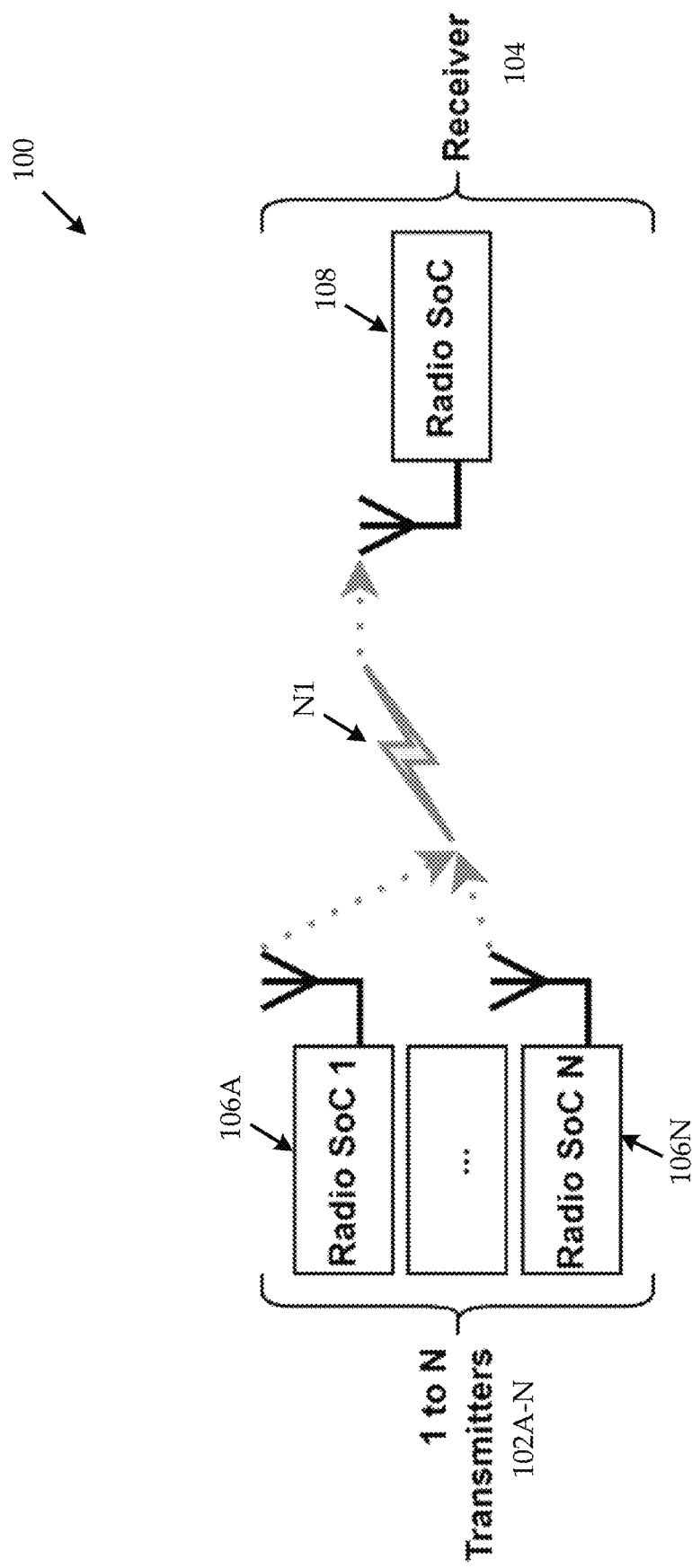
FIG. 1 illustrates a block diagram of an example network employing a CT-based flooding protocol with back-to-back transmission slots and a per-slot channel hopping capability. according to an embodiment.

A Concurrent Transmission (CT) based network can provide multi-hop mesh networks with high reliability, network-wide synchronization, resilience against radio frequency (RF) jamming, and a lowest possible latency dictated by an underlying physical layer. When utilized for mesh flooding protocols, routing can be made redundant so the network can easily react to rapid changes caused by node mobility (e.g., such as in unmanned aerial vehicle (UAV) swarm networks).

However, in many cases, such a technique may rely on properties only present in frequency demodulated radios. As such, these techniques may be limited to technologies such as IEEE 802.15.4 and Bluetooth Low Energy (BLE), which may provide far lower data rates (e.g., 100s kbps to 1 or 2 Mbps) than other standards such as Wi-Fi (e.g., up to 100s Mbps in Wi-Fi 6).

The present embodiments relate to devices and systems where a device with multiple concurrently transmitting radios may aggregate each radio link to provide a N*R_PHY link (where N is the number of radios on the device, and R_PHY is the underlying physical data-rate) to increase a maximum available throughput within a transmission. For example, two devices, with each including five concurrently transmitting radios using a BLE 2 Mbps physical layer may be able to use orthogonal frequencies to aggregate those communications into a single link of up to 10 Mbps. Further, if high-throughput transmission is not required, the system can instead use the radios to provide multiple redundant links for a lower data rate transmission. For example, if 2 Mbps is all that is needed, this data-stream could be replicated across all five radios (again over orthogonal frequencies) and aggregated at the receiving device—thus giving 5× redundancy and high-resilience against interference and RF jamming. The present embodiments can therefore be rooted in a resilient, distributed, and adaptive signaling and synchronization scheme for multi-radio wireless mesh networks.

In many instances, device generally communicate with each other politely, meaning that basic principles of conversational manners and wireless design favored strategies that prevent multiple speakers/transmitters to communicate over each other. For example, the tendency to listen before communicating as to not interrupt other communications inspired wireless medium access control (MAC) designs such as carrier sense multiple access with collision avoidance (CSMA/CA), while other approaches not adhering to such principles may achieve less effective communication throughput. Other techniques, such as Time Division Multiple Access (TDMA), can emulate the turn-taking in conversation to communicate data across devices in a network.

Concurrent Transmission (CT)-based communication can encourage multiple wireless devices to transmit data at almost precisely the same time. Data transmitted by multiple concurrent transmitters can be more readily decoded when all the transmitters transmit the same data, due to non-destructive interference effects across the packet. However, in some instances, when data is varied across transmitters, the transmitted symbols do not align and the transmission will not benefit from the effects of non-destructive interference. In such cases, low power wireless radios may only be able to correctly demodulate signals received at sufficiently higher power over other signals due to the physical layer phenomenon known as the capture effect.

This phenomenon has enabled new flexible designs that permit multiple concurrent transmitters to send different data packets simultaneously, resulting in Synchronous Flooding (SF) protocols for multi-hop wireless mesh. FIG. 1 illustrates a block diagram of an example network 100 employing a CT-based flooding protocol with back-to-back transmission slots and a per-slot channel hopping capability. For example, as shown in FIG. 1, the network 100 can include one or more transmitters (e.g., 1 to N transmitters 102A-N) and a receiver 104. Each transmitter 102A-N can be connected to a radio station on a chip (SoC) instances 106A-N. The radio SoC instances 106A-N can concurrently transmit data packets to the receiver 104 (e.g., at a receiver radio SoC 108) over the first CT-based flooding network N1.

Robust Flooding (RoF) is a CT-based flooding technique that can rapidly disseminate data by employing back-to-back transmission slots after a first successful reception without the traditional need to politely backoff or request timeslots from neighboring nodes. Furthermore, the transmission frequency at each timeslot can be governed by a pseudo-random hopping sequence known to each node—providing high resilience to interference and/or jamming within the 2.4 GHz spectrum.

Specifically, SF protocols can provide advantages over other methods, such as a high resilience to 2.4 GHz interference and radio frequency (RF) jamming, minimal end-to-end latency as dictated by the physical layer, and the system being agnostic to network topology (e.g., no routing necessary).

However, while these advantages can be both mathematically, analytically, and empirically proven, in many cases, this technique has only been shown to work only on frequency modulated radios (e.g., IEEE 802.15.4, Bluetooth 5.0, LoRa, Ultra-Wide Band (UWB)). This may limit SF protocols to low throughput use-cases (e.g., the maximum available data-rate in Bluetooth 5.0 is 2 Mbps), while high throughput applications such as audio or video transmission may be unsuited for this technique.

The present embodiments propose an approach where transmissions from multiple CT-based flooding radio SoCs (on a single host device) can combine aggregate channels to provide either high throughput multi-hop communications over multiple, concurrent Synchronous Flooding networks, or provide message replication across aggregate channels for ultra-resilient communication. For example, the present embodiments allow for multiple radios per device, as CT-based flooding protocols may previously only have operated over devices with a single narrowband (NB) radio. Further, the present systems can have a coexistence of multiple concurrent CT-based flooding networks, where other systems may only consider the coexistence of a single CT-based flooding network.

The present system can also implement packet fragmentation and encapsulation, where many CT-based flooding protocols have only considered packets within the size of the Maximum Transmission Unit (MTU) provided by the physical layer (a couple of hundred bytes). Further, the present system can provide adaptive multi-radio throughput/redundancy, where many other CT-based flooding protocols may be implemented on single radio devices. This can place a limit on their throughput (dictated by the underlying physical (PHY) layer). Additionally, this can limit retransmissions to the next available timeslot. The present system can use multiple radios to adapt throughput/reliability at runtime.

A multi-radio CT-based flooding network can have several advantages. For example, by aggregating multiple BLE or IEEE 802.15.4 radio links, the present system can support end-to-end multi-hop high-throughput communication that are provided by the underlying physical layer standard.

Further, by concurrently and simultaneously repeating a packet over multiple links on orthogonal frequencies, the present system can provide high levels of redundancy for ultra-dependable communication across a multi-hop wireless mesh.

Many CT-based solutions that rely on a single radio may be limited to synchronization on a set number of pre-defined channels. If the radio misses a reception on a sync channel, then it may need to wait until the schedule hops to the next sync channel, which may be a number of timeslots away. Having multiple radios can allow each timeslot to contain a sync channel on at least one of the concurrent CT networks. Further, while the introduction of multiple radios increases energy usage for each packet, this combination of low-power radios can still transmit with considerably less power than conventional broadband radios such as Wi-Fi (which can typically be used to provide high-throughput communications). Furthermore, although the lower data rates of such radios results in taking longer to transmit a packet (thus requiring the radio to be on for longer than when using a higher data-rate physical layer) the high-reliability of CT-based flooding protocols can reduce the prospect of retransmissions at each hop in a multi-hop mesh network and remove the need for costly mesh control signaling—unavoidable if using Wi-Fi, for example.

Further, the devices as described herein can aggregate multiple radios operating pseudo-random channel hopping schemes, with each radio operating on orthogonal channels. While a jammer could potentially interfere with one or two of the transmissions, it is unlikely that low-capabilities jammers that use constant or sweeping tones would be able to consistently block transmissions from all radios.

A first example use case can provide a high-throughput multi-hop flooding system for drones and a communication sleeve. For instance, the system can use a flooding capability through BLE/IEEE 802.15.4 radios, which can limit flood-based broadcast communication to a maximum 2 Mbps link (BLE 2M) and be reduced by 1/N per hop across the mesh. This system can benefit from the low-power characteristics of CT-based communication, as it can be applied to provide support for high throughput applications (such as video) without compromising the robustness and RF resilience provided by flood-based communication techniques.

Another example use case can provide a jamming resilient communication and synchronization system. For both drones and phones, there may include a requirement for jamming resilient communication, particularly for critical data such as flight-commands. By replicating packets across multiple orthogonal CT flooding frequencies, it can be extremely difficult for jammers to block signals without constantly jamming the entire spectrum.

Concurrent Transmissions Over 1 . . . N Radios

In many cases, CT implementations are implemented as a single radio, half-duplex system. Although multiple radios have been proposed for cut-through forwarding techniques (e.g., using one radio for Rx and another radio for Tx), the present embodiments can include 1 to N synchronous radios per a host device, within a network of multiple host devices.

Figure 2:
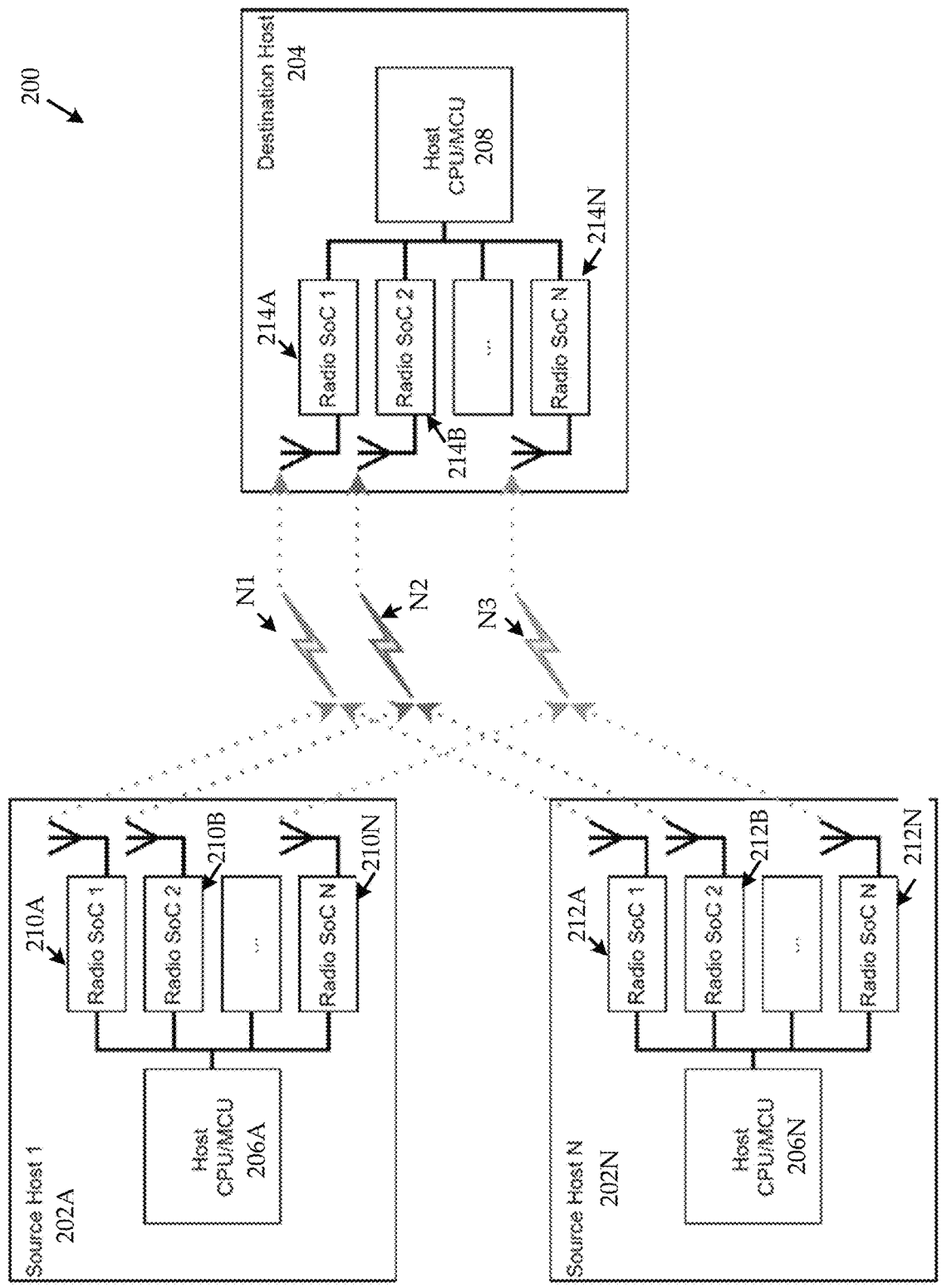
FIG. 2 illustrates an example system with a CT-based radio link transmitting data from multiple transmitters to a single receiver according to an embodiment.

FIG. 2 illustrates an example system 200 with a CT-based radio link transmitting data from multiple transmitters to a single receiver. As shown in FIG. 2, a single device can include multiple Radio SoC nodes (e.g., Radio SoC 1-N). In such instances, the radios can concurrently transmit data to the radio SoC at the receiver.

For example, in FIG. 2, the system 200 can include multiple source host nodes 202A-N. Each host node 202A-N can include a host CPU/MCU 206A-N and a plurality of radion SoC nodes. For example, source host 1 202A can include N radio SoC nodes 210A-N, while source host N 202N can include radio SoC nodes 212A-N. Each radio SoC node (e.g., 210A-N, 212A-N) can be part of a CT-based flooding network. For example, radio SoC nodes 210A and 212A can be part of a first CT-based flooding network N1, and both nodes 210A, 212A can concurrently transmit data to a corresponding receiving radio SoC 214A at a synchronized time and frequency channel. Each CT-based flooding network N1, N2, N3 can include radion nodes configured to concurrently transmit either separate segments of a data packet or replicated instances of the data packet at a single time over orthogonal frequency channels as described herein.

Figure 3:
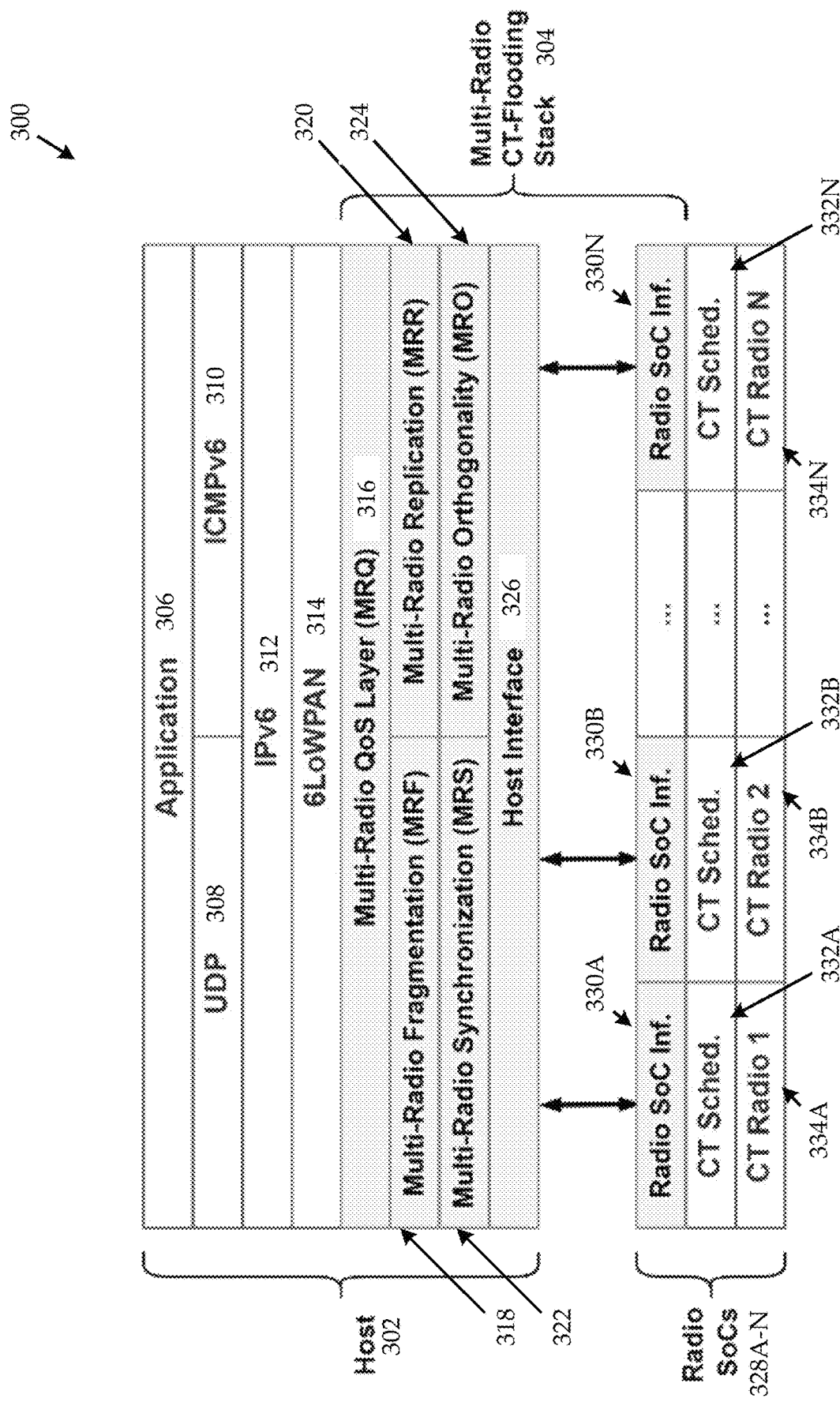
FIG. 3 illustrates an example application layer stack for a device implementing multiple hosts and multi-radio links from multiple transmitters to radios of a single receiver host according to an embodiment.

Further, a host device (e.g., source hosts 202A, 202N) can implement an application layer stack to interact with multiple radio SoCs. FIG. 3 illustrates an example application layer stack 300 for a device implementing multiple hosts and multi-radio links from multiple transmitters to radios of a single receiver host. As shown in FIG. 3, a single source host can include a host CPU/MCU 302 and a number of radio SoC nodes 328A-N. Further, the stack 300 can include a multi-radio CT-flooding stack 304 disposed between the host 302 and radio SoCs 328A-N.

The multi-radio CT flooding stack 304 can include a multi-radio quality of service (QoS) layer (MRQ) 316, a multi-radio fragmentation layer (MRF) 318, a multi-radio replication layer (MRR) 320, a multi-radio synchronization (MRS) layer 322, a multi-radio orthogonality layer (MRO) 324, and a host interface 326. MRQ 316 can be used to obtain reliability and throughput requirements for transmission of a data packet to determine whether to initialize a packet fragmentation process (by MFR 318) or a packet replication process (by MRR 320). The MRS 322 can synchronize a time of transmission of a data packet for each radio node across devices in the network. The MRO 324 can distribute orthogonal frequency channels for each CT-based flooding network as described herein.

The Multi-Radio QoS Layer (MRQ) can include a mechanism, component, or module that manages Quality of Service (QoS) requirements by passing IPv6 packets to either fragmentation and/or replication services. The Multi-Radio Fragmentation (MRF) can include a service of the MRQ that allows IPv6 packets to be fragmented and distributed across multiple radios when in one configuration, as well as allowing fragments to be collected from multiple radios and reassembled in another configuration. The Multi-Radio Replication (MRR) can include a service of the MRQ that allows IPv6 packets to be replicated and distributed across multiple radios when in one configuration, as well as allowing packets to be collected from multiple radios and eliminate duplicate packets in another configuration. The Multi-Radio Synchronization (MRS) can include a service that, through selection of a master radio SoC and through operation of a CT-based flooding network on the master radio SoC, synchronizes other (client) radio SoCs to the clock source of the master radio SoC. The Multi-Radio Orthogonality (MRO) can include a service that ensures available RF channels may be distributed orthogonally across all radio SoCs at each timeslot within the respective CT-based flooding schedules for all available radios on the host device. In some instances, all radios may synchronously transmit on orthogonal channels, or all radios may synchronously transmit on the same channel, and any variation in between.

Further, at the host 302, the stack can include an application layer 306, a user services platform (USP) layer 308 and an internet control message protocol for IPv6 (ICMPv6)

layer 310. The stack can further include an IPv6 layer 312 and a IPv6 over low power wireless personal area network (6LoWPAN) layer 314. Each radio SoC 328A-N can include a radio SoC interface 330A-N, a CT scheduler 332A-N, and a CT radio 334 A-N. The radios 328A-N can be configured to obtain an instruction to concurrently transmit one or more data packets across a network to a receiver as described herein.

Management of Multiple CT Radio Links

In many instances, a CT-based device can include synchronous, half-duplex single-radio devices within a multi-hop wireless network. Nodes can listen for a flood initiated by one or more devices within the network and perform packet inspection to devise the relay count of the transmission. By multiplying the relay count (e.g., the slot index) by the length of the timeslot, a node can synchronize to the initial transmission and carefully schedule its next transmission to forward the packet as a synchronous, concurrent transmission with nearby nodes.

Figure 4:
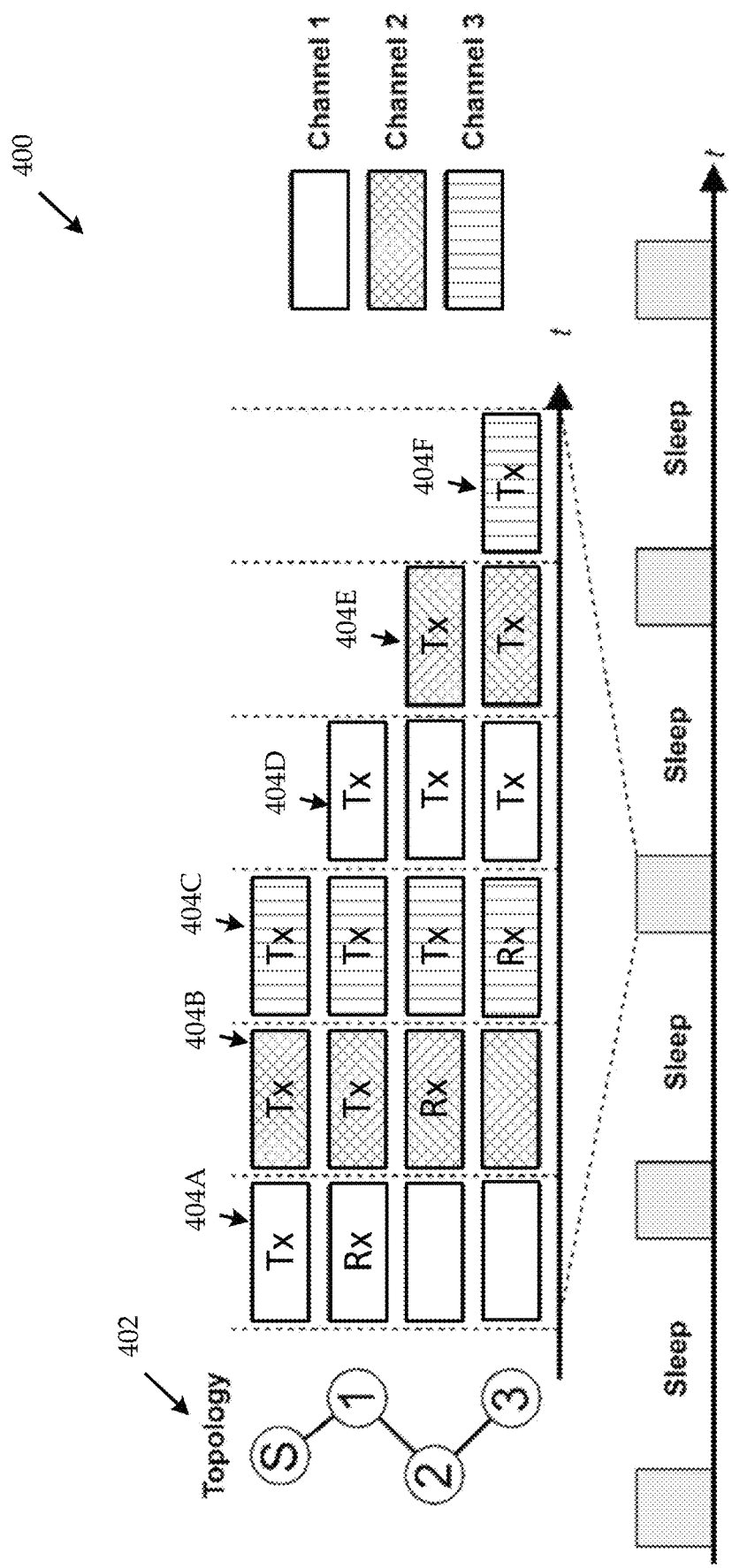
FIG. 4 illustrates an example diagram showing scheduling of time slots for a single-radio device in a multi-hop wireless network according to an embodiment.

FIG. 4 illustrates an example diagram 400 showing scheduling of time slots for a single-radio device in a multi-hop wireless network. As shown in FIG. 4, a number of time slots (e.g., 404A-F) can be assigned for the device. For example, a first slot 404A can transmit a data packet over a first channel, and a second slot 404B can transmit another data packet over a second channel. Other timeslots can be specified for receipt of data across each channel. In the embodiment as shown in FIG. 4, the radio transmitting the data according to the timeslots can be part of the single-radio device can concurrently transmit data for each corresponding timeslot with other radios in the multi-hop network.

Figure 5:
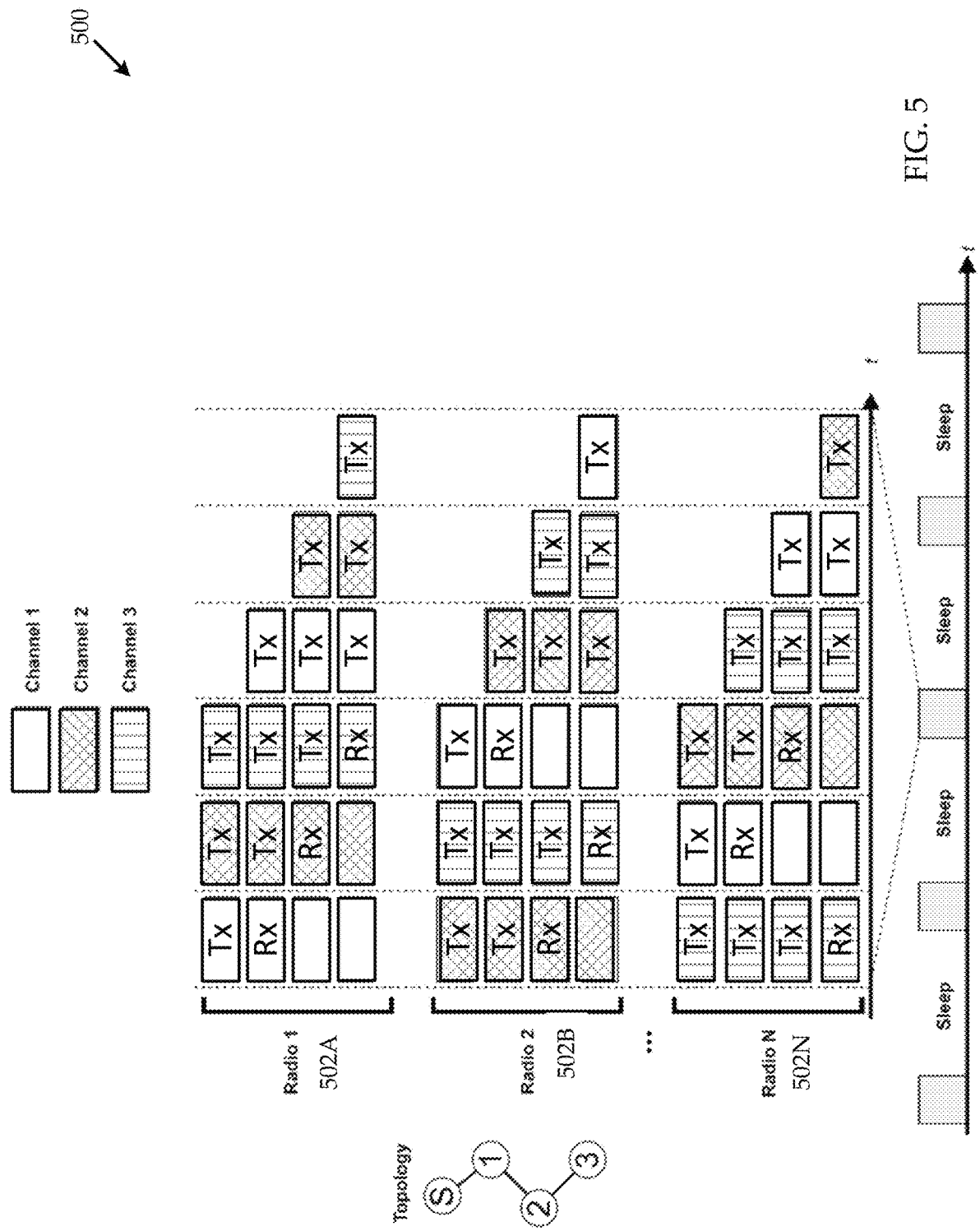
FIG. 5 illustrates an example diagram showing scheduling of time slots for a multi-radio device in a multi-hop wireless network according to an embodiment.

The present embodiments describe CT-based transmission of data across devices with multiple radios for each host device. Each radio can operate with a SF communication schedule that is independent from other radios on each host device. FIG. 5 illustrates an example diagram 500 showing scheduling of time slots for a multi-radio device in a multi-hop wireless network.

As shown in FIG. 5, a host device can include multiple radios 502A-N. Each radio can have an independent SF communication schedule, with each radio part of a unique CT-based flooding network as described herein. For instance, at a first time instance, a first radio 502A can transmit data on a first channel, a second radio 502B can transmit data on a second channel, and a third radio 502C can transmit data on a third channel. The various channels can be orthogonal so as to mitigate interference in transmitting the data concurrently.

As described above, multiple services that are part of the multi-radio CT-flooding stack (e.g., 304) can interact to implement data transmission across multiple CT-flooding networks on a multi-radio host device.

Shortly before the CT flood process over M slots, the individual radio SoCs can poll the MRO for a channel list for use during the flood process. This channel list can be orthogonal to the channel list of the other radios. Subsequently, if the node is allocated as a SOURCE node during this flooding round, the MRQ layer can be polled by all radio SoCs to check for packet fragments and/or duplicate packets from the higher layer. If there are fragments/duplicates available (in the form of MAC-layer frames), these can be allocated to the individual radios by the MRQ, and subsequently buffered.

During the flood process, each radio can operate consistent with many CT-based flooding protocols. After this process has concluded, a SYNC round type (determined either statically or dynamically though header information) can trigger the MRS synchronization process. Further, if a node was allocated as a RECEIVER node during the flooding round, any received MAC-level frames can be sent to the MRQ, which can inspect header information either buffer and reassemble packet fragments or eliminate duplication of replicated packets.

Figure 6:
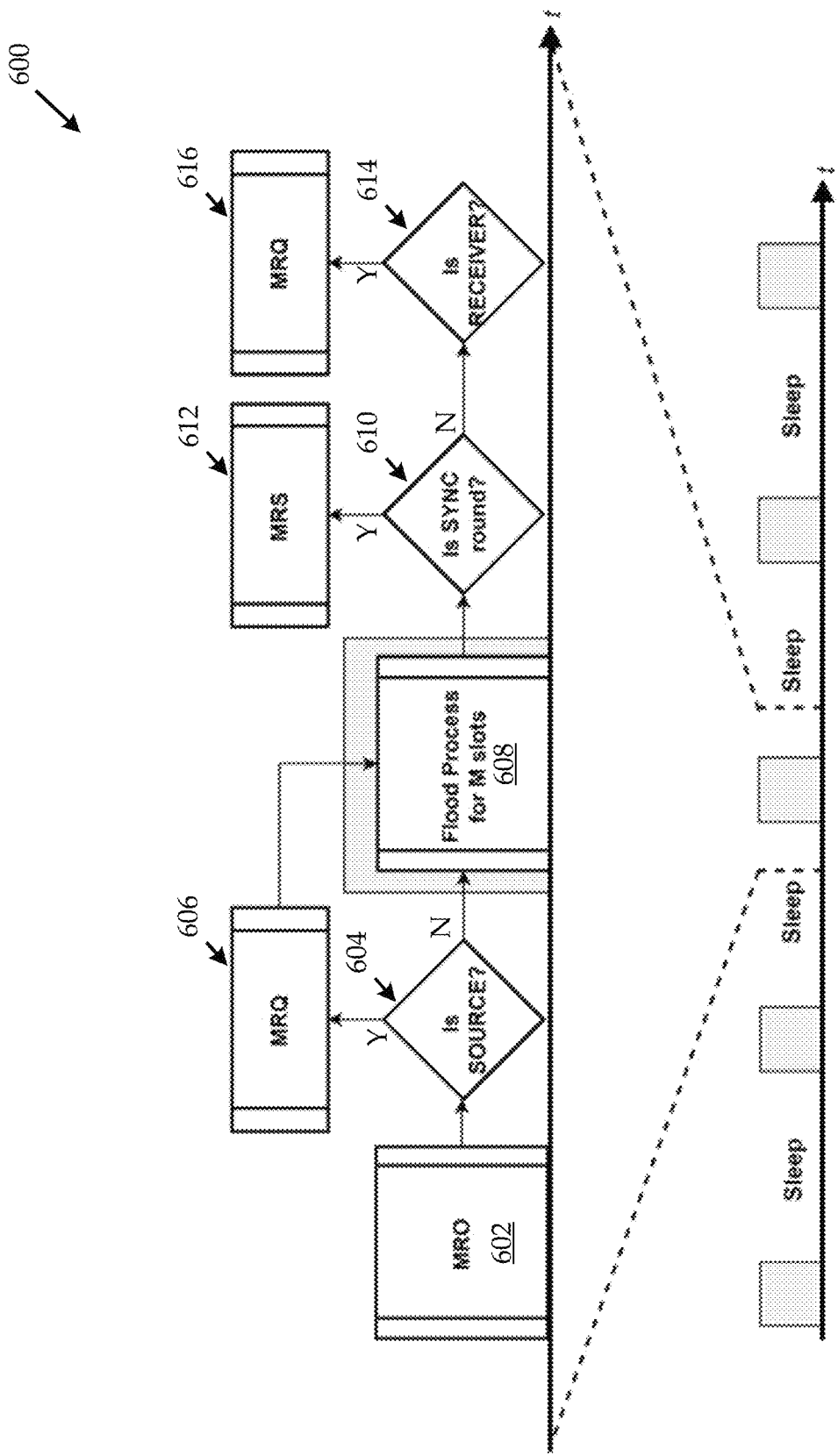
FIG. 6 illustrates a flow process of a high-level overview of how the services interact within a CT-based flood network data transmission process according to an embodiment.

FIG. 6 illustrates a flow process 600 of a high-level overview of how the services interact within a CT-based flood network data transmission process. At 602, the host device can implement a multi-radio orthogonality (MRO) process. As described in greater detail below, a MRO process can include identifying CT-flooding networks for each radio for the host device and selecting orthogonal frequency channels for each CT-flooding network. The selection of the frequency channels can be set by the host device or the channel information can be obtained by another device in the network.

At 604, the host device can determine whether the device is a source device. The source device can include a device in the network determining whether to fragment data or replicate the data across CT networks, setting the frequency channels, and/or synchronizing the times for transmitting data (e.g., as part of the MRS service).

If the host device is the source device, a multi-radio QoS service (e.g., 606) can be initiated. The MRQ service can review the data to be transmitted and/or historical data throughput and reliability requirements for the network to determine whether the data is to be fragmented or replicated as described herein.

At 608, a flooding process can be performed for M slots. The flooding process can include transmitting data over the multiple radios at a time synchronized across devices in the network according to the channels selected for each radio.

At 610, the host device can determine whether a transmission round is a synchronization round. If yes, a MRS process can be performed (e.g., at 612). The MRS process can include synchronizing a time of transmission of data as described herein.

At 614, the host device can determine whether the device is a receiver. If the device is a receiver, the MRQ process can be performed (e.g., at 616).

Multi-Radio Orthogonality (MRO) Overview

As described herein, a multi-radio orthogonality (MRO) process can include assigning orthogonal frequency channels for multiple radios part of a host device. Further, the host device can include a MRO layer part of the multi-radio CT-flooding stack that can implement a MRO process.

Figure 7:
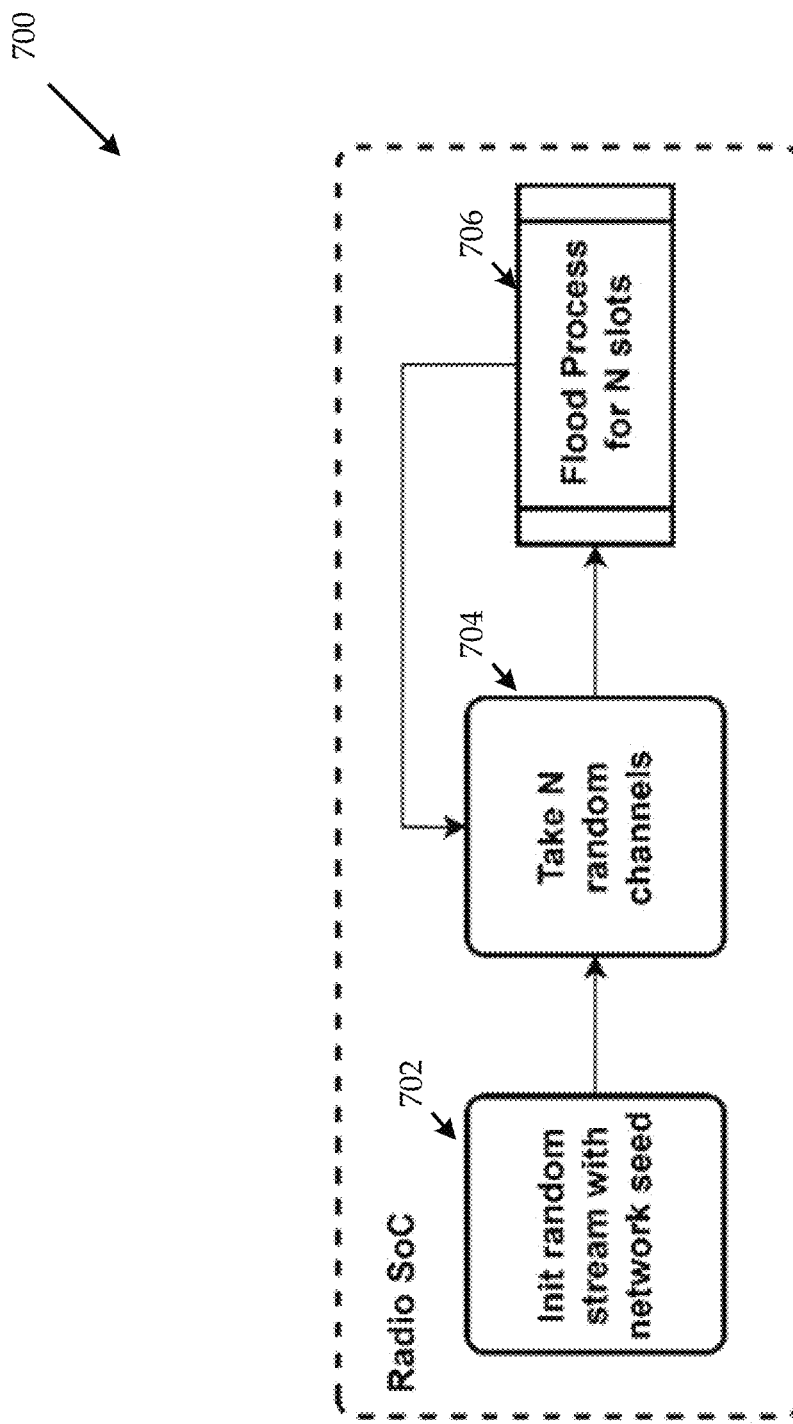
FIG. 7 is a flow diagram of an example channel hopping process in a CT-based flooding network according to an embodiment.

FIG. 7 is a flow diagram 700 of an example channel hopping process in a CT-based flooding network. At 702, a radio SoC can initialize a random stream with a network seed. Further, at 704, N random channels can be identified. The random channels can be assigned a frequency channel for the CT-flooding network. At 706, the flooding process can be initiated for N slots. The flooding process can include transmitting the data packets at the assigned frequency channel concurrently with other radio SoCs part of the CT flooding network.

Further, the present embodiments, due to the synchronous and concurrent operation of multiple radio SoCs, can also maintain frequency orthogonality between all co-located CT networks. To this end, the present embodiments can utilize a N radio by M slot matrix of orthogonal channel permutations. This matrix is generated, maintained, and allocated by the MRO component.

Figure 8:
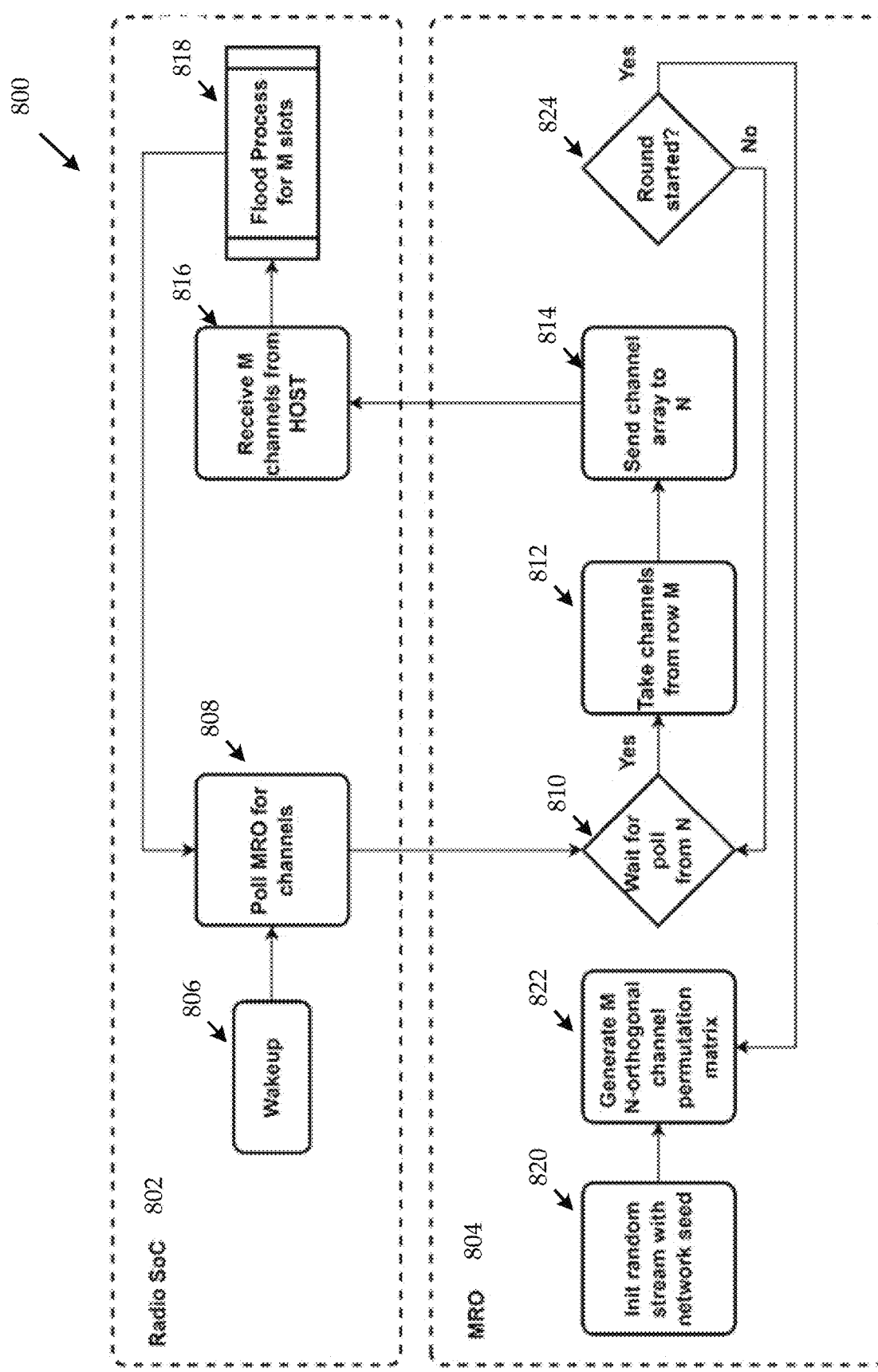
FIG. 8 is a flow process for implementing a MRO process for a multi-radio host device according to an embodiment.

FIG. 8 is a flow process 800 for implementing a MRO process for a multi-radio host device. A radio SoC 802 can interact with a MRO layer 804 part of the multi-radio flooding stack implemented by the host device.

At 806, the radio SoC can wakeup. At 808, the radio can poll MRO for frequency channels. At 810, the MRO can wait for the poll from the radio N (e.g., 802). If the poll is obtained, at 812, the channels can be obtained from row M of the matrix.

At 814, the MRO 804 can send the channel array specifying all channels to the radio (e.g., 802). At 816, the radio 812 can obtain the M channels in the array from the host device 804. At 818, the radio 802 can initiate the flooding process for M slots at the channel specified in the channel array. After completion of the flooding process, the radio 802 can poll the MRO 804 for channels (e.g., 808).

Further, the MRO 804 can initialize a random stream with the network seed. The MRO 804 can then, at 822, generate a matrix including M-N orthogonal channel permutations. The matrix can be used to assign channels for each radio as described herein. At 824, it can be determined whether a round has started. If the round has started, the matrix for the channels can be generated (e.g., 822). If not, the MRO 804 can wait for the poll from the radio 802 (e.g., in 810).

Multi-Radio Synchronization (MRS):

In many cases, a CT-based flooding network can maintain synchronization across a multi-hop radio network through the designation of static SYNC round types. These round types can allow nodes to SYNC to the radio of a statically designated time sync node through the following calculation:

$$t_{ref} = M^*(t_{air} + t_{tifs}) - t_{shift}$$

For example, $t_{air}$ is the on-air time of the full packet data frame, $t_{tifs}$ is the inter-frame spacing and $t_{shift}$ is the difference between the time taken as the reference time on the timesync and the time that the packet arrives at a receiving node (typically an radio enable event on the timesync radio and then a frame delimiter event on a receiving node).

Figure 9:
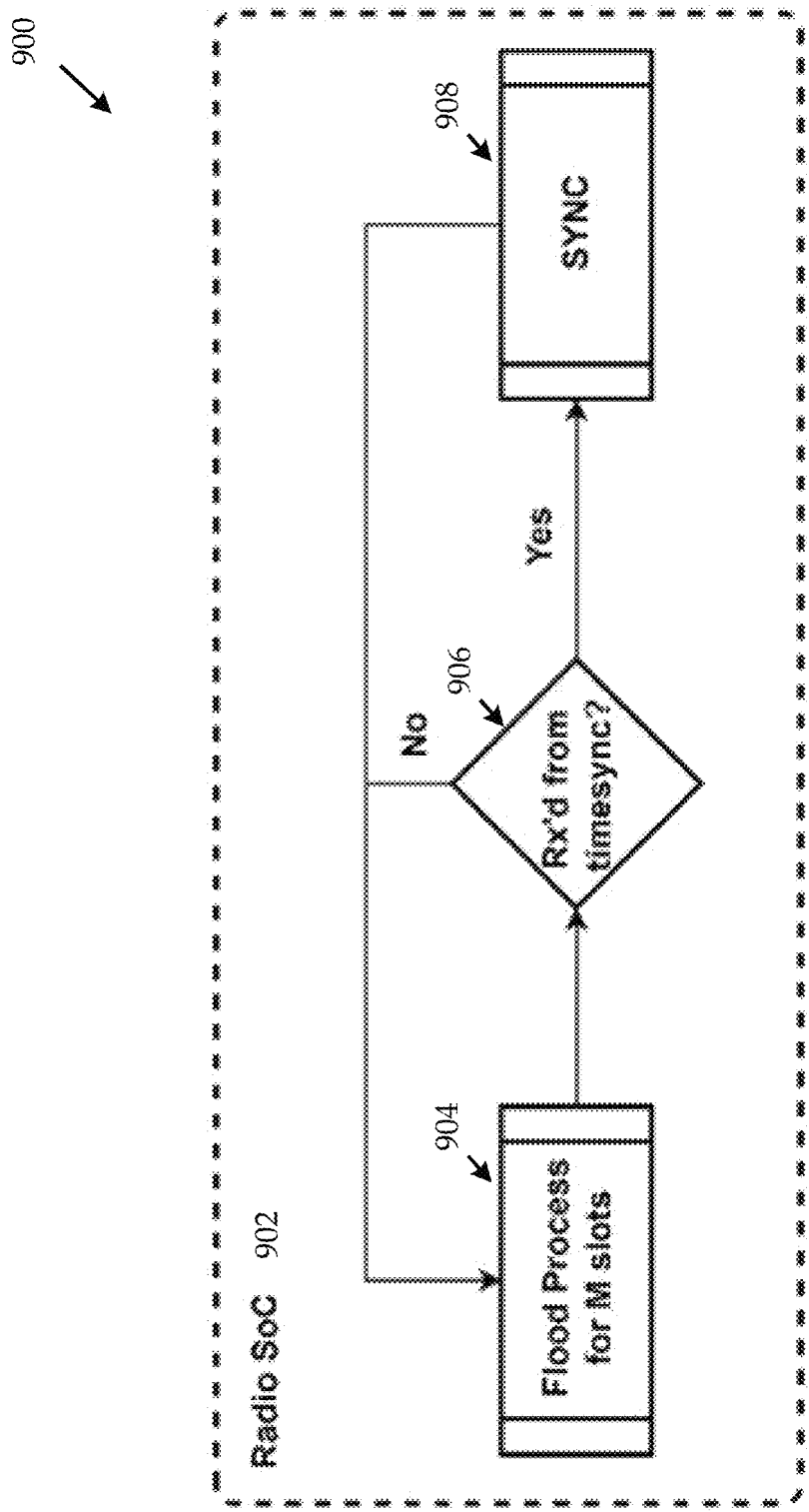
FIG. 9 is a flow process of an example synchronization process according to an embodiment.

FIG. 9 is a flow process 900 of an example synchronization process. At 904, the radio 902 can perform the flood process for M slots. At 906, the radio 902 can determine whether it received a timesync message. If the radio obtained the timesync message, at 906, the radio 902 can synchronize a time of transmission future data according to the timesync. If not, the radio 902 can perform a subsequent flooding process (e.g., 904).

Additionally, a multi-radio host device can maintain synchronization between multiple radio SoCs on the host device within the network. In this process, the host device can designate a MAIN CT-flooding network to which a MAIN radio is designated. This MAIN network can be used as a time reference for all other CT flooding SUB networks. During a SYNC round type, if a radio receives from a timesync (on any CT network), it can create a temporary $t_{ref}$ reference time, and signal the MRS with this reference time. The MRS can receive this reference and can wait for the reference from all other radios until it receives the reference time from the radio allocated to the MAIN network, or if a maximum time has expired. If the MRS has received a reference time from the MAIN network, this can be used as the reference time. If the MRS has not received from the MAIN network, the MRS can take a median (windowed) reference time from all received SUB networks. This reference time can then be offset with the delay incurred due to transmission to (and from) the HOST interface and can be sent to all radios. On each radio SoC, this reference time can be used as the final synchronization time.

Figure 10:
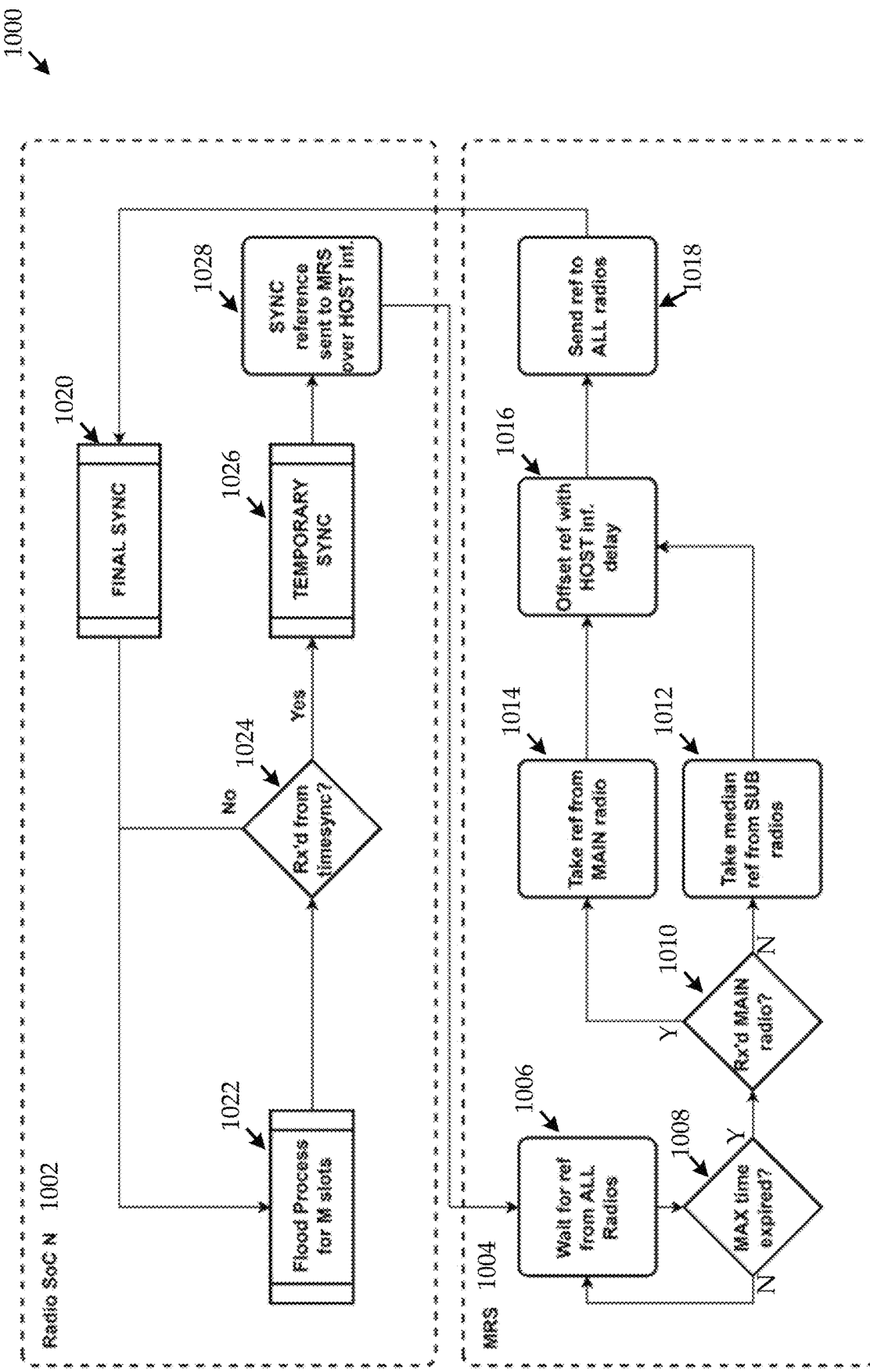
FIG. 10 is a flow process for maintaining synchronization between multiple radio SoCs on the host device within the network according to an embodiment.

FIG. 10 is a flow process 1000 for maintaining synchronization between multiple radio SoCs on the host device within the network. At 1006, the MRS 1004 implemented by the host device can wait for a reference signal from all radio nodes. At 1008, the MRS 1004 can determine whether a maximum time has expired. If the maximum time has expired, the MRS can continue to wait (e.g., at 1006). If not, the MRS can determine whether it received a MAIN signal from another node (e.g., 1010). If the MAIN was received, a ref can be taken from the MAIN radio (e.g., 1014). If the MAIN was not received, the median ref can be taken from SUB radios (e.g., 1012).

At 1016, the MRS 1004 can offset the ref with a HOST interface delay. At 1018, the MRS can send the ref to all radios (e.g., radio SoC N 1002). At 1020, the radio 1002 can perform a final synchronization process. This can include synchronizing a time for transmitting data at the flooding process (e.g., 1022). At 1024, the radio can determine whether a timesync was received. If the timesync is received, the radio can perform a temporary sync (e.g., 1026). If not, the flooding process can be repeated (e.g., at 1022). Further, at 1028, the radio can send a SYNC ref to the MRS over a HOST interface.

Multi-Radio Fragmentation (MRF)

Packet fragmentation has been employed in various low-power wireless standards such as 6LoWPAN and IETF 6TiSCH, for example, to accommodate IPv6 connectivity on constrained networks. In these standards, larger packets can be fragmented at the source (either at Layer 3 or Layer 2) to accommodate limited Layer 1 (i.e.: physical layer) maximum Transmission Unit (MTU) sizes and then reconstructed at the destination.

In contrast to these approaches, the present embodiments can define a MRF service capable of fragmenting a packet across multiple, concurrent, CT-based flooding networks for the purposes of increasing end-to-end data throughput between tuples of source and destination nodes by utilizing simultaneous orthogonal side-channels enabled by the MRS, MRO and multiple radio SoCs on each host device.

Figure 11:
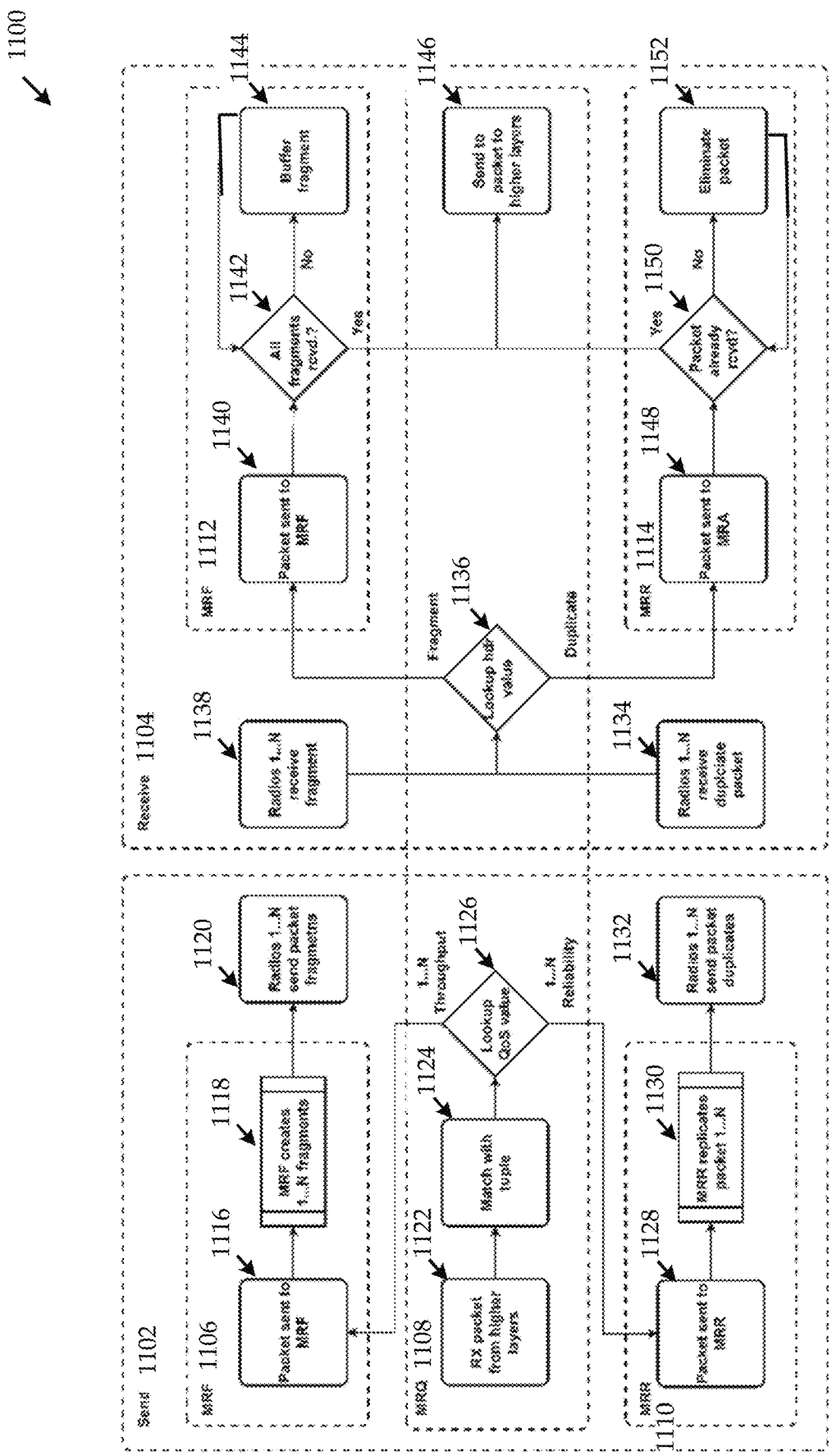
FIG. 11 is a flow process for implementing a packet fragmenting and/or replications for both SEND and RECEIVE according to an embodiment.

The operation of the MRF service for both SEND and RECEIVE is defined in FIG. 11. FIG. 11 is a flow process 1100 for implementing a packet fragmenting and/or replications for both SEND and RECEIVE.

As shown in FIG. 11, both a send process 1102 and a receive process 1104 can be implemented. At 1106, a MRF (packet fragmentation) process can be implemented. At 1116, a packet can be obtained at the MRF layer. At 1118, the MRF can create 1 . . . N fragments. Each fragment can include part of a data packet for transmission concurrently on each CT flooding network.

At 1120, the radios can send packet fragments to a receiver. The packet fragments can optimize throughput of the data packet by transmitting fragments concurrently over multiple CT flooding networks.

At 1138, at a receiver (e.g., receive 1104), radios can receive the fragments from the sending radio nodes. At 1136, HDR values can be looked up for each fragment. If the data comprises a fragment, at MRF 1112, the packet is obtained at the MRF 1112 (e.g., 1140). At 1142, the MRF can determine if all fragments have been received. At 1144, if the fragments have not all been received, the fragment can be buffered. At 1146, if the fragments have all been received, the packet can be sent to higher level layers.

At 1122, a MRQ 1108 can receive a packet from higher layers. At 1124, the MRQ can match with a tuple. At 1126, the MRQ can look up a QoS value. If the QoS value comprises 1 . . . N throughput, the data packet can be fragmented (e.g., in 1116). If the QoS value comprises 1 . . . N reliability, a MRR process can be performed.

At 1128, the packet can be sent to the MRR 1110. At 1130, the MRR can replicate each packet. At 1132, the radios 1 . . . N can send the duplicated packets to the receiver radio nodes.

At 1134, in the embodiments where packets are At 1136, if the packets are replicated, the packet can be sent to an MRR 1114 (e.g., 1148). The MRR 1114 can determine (e.g., at 1150) if the packet is already received. If yes, the packet can be sent to higher layers (e.g., at 1146). If not, the packet can be eliminated (e.g., at 1152).

Multi-Radio Replication

Similar to packet fragmentation, packet replication (e.g., packet retransmission) can be used in several protocols to achieve high reliability. For example, in some CT-based flooding protocols, nodes can transmit a packet up to N times, where N is a configurable parameter value of the protocol. As another example, IEEE 802.15.4 Time Slotted Channel Hopping (TSCH) based protocols, multiple time slots in a single or multiple super frames can be dedicated to transmitting exactly the same packet from a source to destination(s).

In both cases, additional (duplicate) copies of a packet can be eliminated at the destination, with only a single packet then forwarded to higher layers. In contrast to these approaches, the present embodiments can provide a MRR service capable of replicating packets across multiple, concurrent, CT-based flooding networks for the purposes of increasing end-to-end reliability (and consequently improving latency) between tuples of source and destination nodes by utilizing simultaneous orthogonal side-channels enabled by the MRS, MRO, and multiple radio SoCs on each host device.

In the approaches as described herein, the MRQ layer can take a similar role to the Host Interface layer and can act as input/output to packets sent from higher layers. At a SENDER, the MRQ can take packets and references a tuple (e.g., src, dst, priority, etc.) against a set of defined rules which return a QoS value (i.e., Throughput OR Reliability). Based on this return value, matching packets are sent to either the MRF (for fragmentation), or MRR (for replication), and distributed across 1 . . . N radio SoCs.

At a RECEIVER, radios 1 . . . N can receive fragments/duplications and can determine from header information whether the packet should be sent to the MRF (for assembly) or MRR (for elimination). In the first case, fragments can be buffered until all fragments are received. In the later, packets can be eliminated when matched against a list of already-received packet tuples.

Example Method for Implementing Multi-Radio Concurrent Transmission

As described herein, the present embodiments relate to methods and systems for multi-radio concurrent transmission of data across a wireless network. For example, a host device can include multiple radios, where each radio is part of a concurrent transmission network with other radio nodes in the network. Each CT-based flooding network can concurrently transmit data at a selected orthogonal frequency channel. Either replicated instances or a fragment of a data packet can be transmitted by radios part of each CT flooding network.

Figure 12:
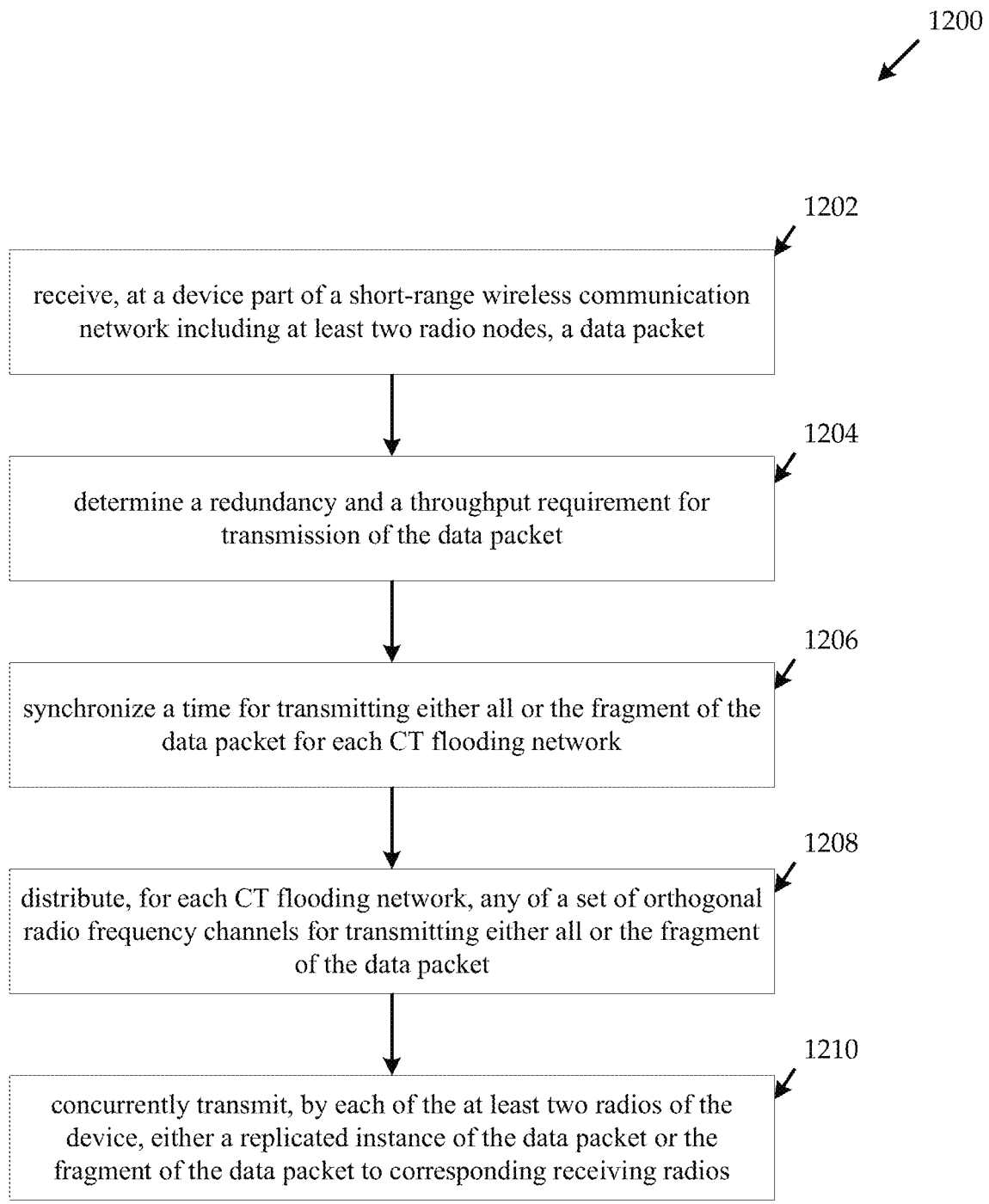
FIG. 12 is a flow process of an example method for multi-radio concurrent data transmission across a wireless network according to an embodiment.

FIG. 12 is a flow process of an example method for multi-radio concurrent data transmission across a wireless network. The method can be implemented by a host device (e.g., source host 202A including host CPU/MCU 206A in FIG. 2) including multiple radios (e.g., radios SoCs 1-N 210A-N).

At 1202, the method can include receiving, at a device part of a short-range wireless communication network, a data packet. The device (e.g., 202A) can include at least two radio nodes (e.g., 210A-N). Each of the at least two radio nodes can be part of a concurrent transmission (CT) flooding network configured to concurrently transmit data to one or more corresponding receiving radios with corresponding radio nodes of other devices in the short-range wireless communication network. For example, in FIG. 2, a first CT-based flooding network N1 can include radios 210A and 212A configured to concurrently transmit data over a frequency channel to a receiving radio 214A at a destination host 204.

In some instances, the short-range wireless communication network implements a wireless communication protocol with a frequency between 2.4 and 6 gigahertz. Further, the data packet can include any of an internet protocol version 4 (IPv4) or an internet protocol version 6 (IPv6) data packet.

At 1204, the method can also include determining a redundancy and a throughput requirement for transmission of the data packet. Any of a packet fragmentation process (e.g., implemented by MRF layer 318 in FIG. 3) and a packet replication process (e.g., implemented by MRR 320 in FIG. 3) can be implemented based on the redundancy and throughput requirements. In some instances, a QoS value can be derived by a MRQ layer specifying a priority of throughput of data transmission or data reliability in transmitting data. For example, if the QoS provides a positive throughput value, a throughput requirement for data transmission can exceed a threshold. In this example, the MRF process can be implemented to fragment the packet to increase throughput of the data transmission. Alternatively, if the QoS provides a reliability value exceeding a threshold, the MRR process can be implemented to replicate data packets to increase reliability of obtaining the data packet.

In some instances, responsive to determining that the throughput requirement for transmission of the data packet exceeds a threshold, implementing the packet fragmentation process that includes dividing the data packet into a series of fragments and assigning each fragment to each CT flooding network. Radios that are part of each CT flooding network can transmit each corresponding fragment of the data packet.

In some instances, responsive to determining that the throughput requirement for transmission of the data packet does not exceed a threshold, implementing the packet replication process that includes replicating the data packet into a series of data packet instances. Radios that are part of each CT flooding network can transmit each corresponding replicated instance of the data packet.

At 1206, the method can also include synchronizing, across all devices configured to transmit either all or a fragment of the data packet in the short-range wireless communication network, a time for transmitting either all or the fragment of the data packet for each CT flooding network. The MRS layer (e.g., 322 in FIG. 3) can synchronize times for transmitting data as described herein. The device can synchronize the times for transmitting either all or the fragment of the data packet for each CT flooding network across all devices that are configured to transmit either all or the fragment of the data packet in the short-range wireless communication network.

At 1208, the method can also include distributing, for each CT flooding network, any of a set of orthogonal radio frequency channels for transmitting either all or the fragment of the data packet. A MRO layer (e.g., 324 in FIG. 3) can either distribute or obtain instructions to distribute the orthogonal radio frequency channels for each CT flooding network. IN some instances, the distribution of the set of orthogonal radio frequency channels further includes distributing the set of orthogonal radio frequency channels for each CT flooding network across each CT flooding network for each timeslot according to schedules of each CT flooding network.

At 1210, the method can also include concurrently transmitting, by each of the at least two radios of the device, either all or the fragment of the data packet to corresponding receiving radios.

In another example embodiment, a device is provided. The device can include at least two radio nodes. Each radio can be part of a concurrent transmission (CT) flooding network configured to concurrently transmit data to one or more corresponding receiving radios with corresponding radio nodes of other devices in a short-range wireless communication network.

The device can also include a controller connected to the at least two radio nodes. The controller can be operative to receive a data packet and synchronize, across all other devices configured to transmit either all or a fragment of the data packet in the short-range wireless communication network, a time for devices in each CT flooding network to transmit either all or the fragment of the data packet. The controller can also be operative to distribute, for each CT flooding network, any of a set of orthogonal radio frequency channels for transmitting either all or the fragment of the data packet.

The controller can also perform one of fragmenting the data packet into a set of fragments or replicating the data packet for transmission across each CT flooding network via a packet replication process. Each fragment can be transmitted by each CT flooding network via a packet fragmentation process. The controller can also be operative to send an instruction to the at least two radio nodes to concurrently transmit, by each of the at least two radios of the device, either all or the fragment of the data packet to corresponding receiving radios at corresponding frequency channels and at the time specified for each corresponding CT flooding network.

In some instances, the controller can be further operative to determining a redundancy and a throughput requirement for transmission of the data packet. Any of the packet fragmentation process and the packet replication process can be implemented based on the redundancy and throughput requirements.

In some instances, the controller can be further operative to, responsive to determining that the throughput requirement for transmission of the data packet exceeds a threshold, implementing the packet fragmentation process including dividing the data packet into a series of fragments and assigning each fragment to each CT flooding network. Radios part of each CT flooding network can transmit each corresponding fragment of the data packet.

In some instances, the controller can be further operative to, responsive to determining that the throughput requirement for transmission of the data packet does not exceed a threshold, implementing the packet replication process including replicating the data packet into a series of data packet instances. Radios part of each CT flooding network can transmit each corresponding replicated instance of the data packet.

In some instances, the short-range wireless communication network includes a network implementing a Bluetooth or Bluetooth low energy (BLE) wireless communication protocol.

In some instances, the device can include a host interface comprising a physical layer interface to communicate with the at least two radios. The instruction can be sent to the at least two radios via the host interface.

In some instances, the device can include a multi-radio CT flooding stack part of a medium access control (MAC) layer of the device.

In another example embodiment, a computer-readable storage medium is provided. The computer-readable storage medium can contain program instructions for a method being executed by an application. The application can comprise code for one or more components that are called by the application during runtime. Execution of the program instructions by one or more processors of a computer system can cause the one or more processors to perform a series of steps.

The steps can include receiving a data packet. Either all or a portion of the data packet can be configured to be transmitted by each of at least two radios to a receiving radio node. Each of the at least two radios can be part of a concurrent transmission (CT) flooding network configured to concurrently transmit all or the portion of the data packet with corresponding radio nodes of other devices.

The steps can also include performing one of fragmenting the data packet into a set of fragments or replicating the data packet for transmission across each CT flooding network via a packet replication process. Each fragment can be transmitted by each of a series of CT flooding networks via a packet fragmentation process.

The steps can also include determining, for each CT flooding network for the at least two radios, a time for transmitting either all or the portion of the data packet and a selected orthogonal radio frequency channel of a set of orthogonal radio frequency channels. The steps can also include concurrently transmitting, by each of the at least two radios, either all or the portion of the data packet to the corresponding receiving radio nodes at the time for transmitting and at the selected orthogonal radio frequency channel for each CT flooding network.

In some instances, execution of the program further causes the one or more processors to perform steps comprising synchronizing, across all other devices configured to transmit either all or the fragment of the data packet, the times for transmitting either all or the portion of the data packet, and distributing, to the other devices configured to transmit either all or the fragment of the data packet, each of the set of orthogonal radio frequency channels for each CT flooding network to transmit either all or the fragment of the data packet.

In some instances, the time for transmitting either all or the portion of the data packet and the selected orthogonal radio frequency channel of a set of orthogonal radio frequency channels is obtained from another device configured to transmit either all or the fragment of the data packet.

In some instances, execution of the program further causes the one or more processors to perform steps comprising determining a redundancy and a throughput requirement for transmission of the data packet. Any of the packet fragmentation process and the packet replication process can be implemented based on the redundancy and throughput requirements.

Responsive to determining that the throughput requirement for transmission of the data packet exceeds a threshold, the packet fragmentation process can be implemented. The packet fragmentation process can include dividing the data packet into a series of fragments and assigning each fragment to each CT flooding network. Radios part of each CT flooding network can transmit each corresponding fragment of the data packet. Responsive to determining that the throughput requirement for transmission of the data packet does not exceed a threshold, the packet replication process can be implemented. The packet replication process can include replicating the data packet into a series of data packet instances. Radios that are part of each CT flooding network can transmit each corresponding replicated instance of the data packet.

In some instances, all or the portion of the data packet is transmitted from the at least two radios to corresponding receiving radio nodes over a short-term wireless communication network. The short-term wireless communication network can implement a wireless communication protocol with a frequency range 2.4-6 gigahertz.

In some instances, the data packet comprises any of an internet protocol version 4 (IPv4) or an internet protocol version 6 (IPv6) data packet.

Figure 13:
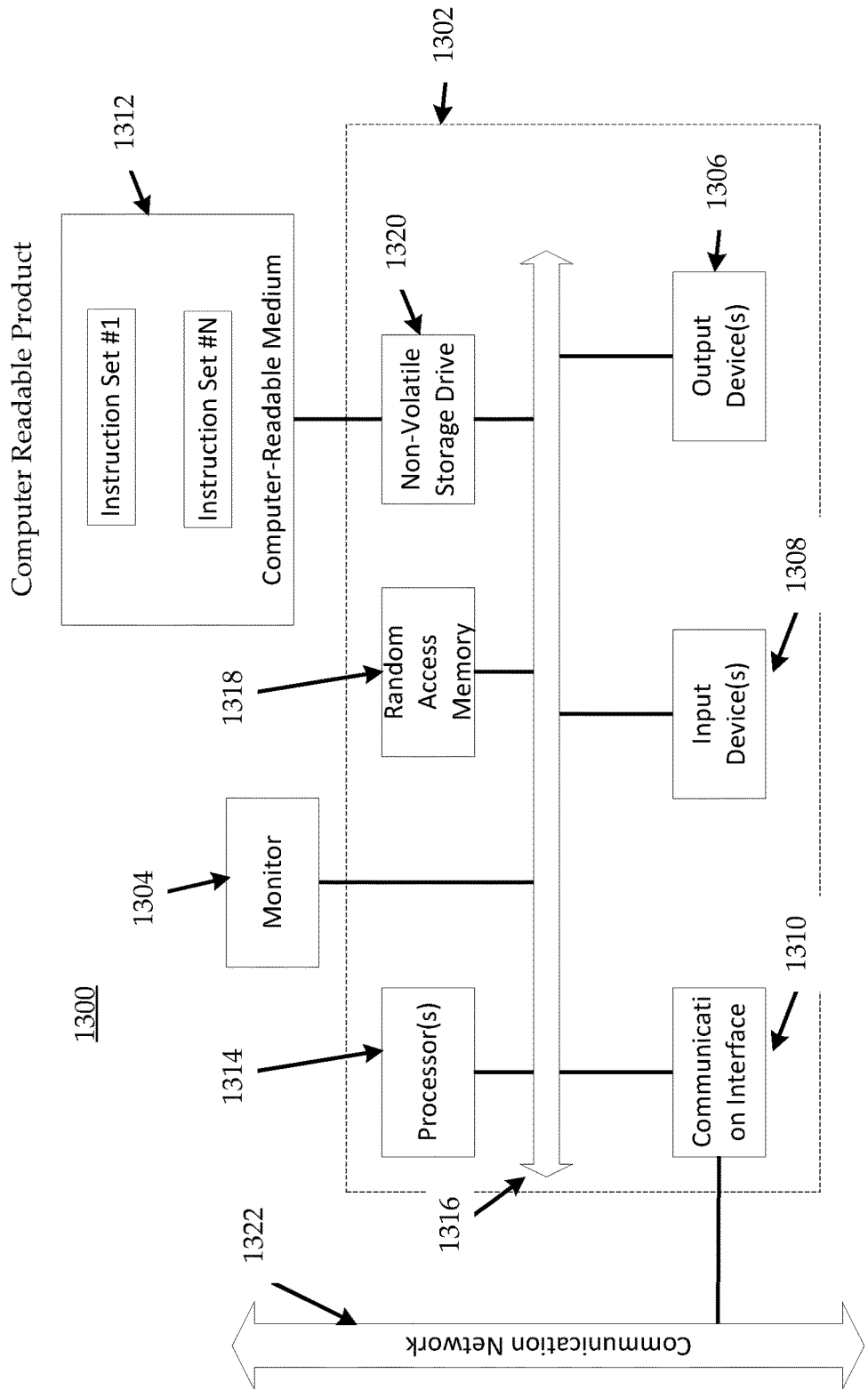
FIG. 13 is a block diagram of a special-purpose computer system according to an embodiment according to an embodiment.

FIG. 13 is a block diagram of a special-purpose computer system 1300 according to an embodiment. For example, system 1300 can deployed in host device 202A in FIG. 2. The methods and processes described herein may similarly be implemented by tangible, non-transitory computer readable storage mediums and/or computer-program products that direct a computer system to perform the actions of the methods and processes described herein. Each such computer-program product may comprise sets of instructions (e.g., codes) embodied on a computer-readable medium that directs the processor of a computer system to perform corresponding operations. The instructions may be configured to run in sequential order, or in parallel (such as under different processing threads), or in a combination thereof.

Special-purpose computer system 1300 comprises a computer 1302, a monitor 1304 coupled to computer 1302, one or more additional user output devices 1306 (optional) coupled to computer 1302, one or more user input devices 1308 (e.g., keyboard, mouse, track ball, touch screen) coupled to computer 1302, an optional communications interface 1310 coupled to computer 1302, and a computer-program product including a tangible computer-readable storage medium 1312 in or accessible to computer 1302. Instructions stored on computer-readable storage medium 1312 may direct system 1300 to perform the methods and processes described herein. Computer 1302 may include one or more processors 1314 that communicate with a number of peripheral devices via a bus subsystem 1316. These peripheral devices may include user output device(s) 1306, user input device(s) 1308, communications interface 1310, and a storage subsystem, such as random access memory (RAM) 1318 and non-volatile storage drive 1320 (e.g., disk drive, optical drive, solid state drive), which are forms of tangible computer-readable memory.

Computer-readable medium 1312 may be loaded into random access memory 1318, stored in non-volatile storage drive 1320, or otherwise accessible to one or more components of computer 1302. Each processor 1314 may comprise a microprocessor, such as a microprocessor from Intel® or Advanced Micro Devices, Inc.®, or the like. To support computer-readable medium 1312, the computer 1302 runs an operating system that handles the communications between computer-readable medium 1312 and the above-noted components, as well as the communications between the above-noted components in support of the computer-readable medium 1312. Exemplary operating systems include Windows® or the like from Microsoft Corporation, Solaris® from Sun Microsystems, LINUX, UNIX, and the like. In many embodiments and as described herein, the computer-program product may be an apparatus (e.g., a hard drive including case, read/write head, etc., a computer disc including case, a memory card including connector, case, etc.) that includes a computer-readable medium (e.g., a disk, a memory chip, etc.). In other embodiments, a computer-program product may comprise the instruction sets, or code modules, themselves, and be embodied on a computer-readable medium.

User input devices 1308 include all possible types of devices and mechanisms to input information to computer system 1302. These may include a keyboard, a keypad, a mouse, a scanner, a digital drawing pad, a touch screen incorporated into the display, audio input devices such as voice recognition systems, microphones, and other types of input devices. In various embodiments, user input devices 1308 are typically embodied as a computer mouse, a trackball, a track pad, a joystick, wireless remote, a drawing tablet, a voice command system. User input devices 1308 typically allow a user to select objects, icons, text and the like that appear on the monitor 1304 via a command such as a click of a button or the like. User output devices 1306 include all possible types of devices and mechanisms to output information from computer 1302. These may include a display (e.g., monitor 1304), printers, non-visual displays such as audio output devices, etc.

Communications interface 1310 provides an interface to other communication networks and devices and may serve as an interface to receive data from and transmit data to other systems, WANs and/or the Internet, via a wired or wireless communication network 1322. In addition, communications interface 1310 can include an underwater radio for transmitting and receiving data in an underwater network. Embodiments of communications interface 1310 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1310 may be coupled to a computer network, to a FireWire® bus, or the like. In other embodiments, communications interface 1310 may be physically integrated on the motherboard of computer 1302, and/or may be a software program, or the like.

RAM 1318 and non-volatile storage drive 1320 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1318 and non-volatile storage drive 1320 may be configured to store the basic programming and data constructs that provide the functionality of various embodiments of the present invention, as described above.

Software instruction sets that provide the functionality of the present invention may be stored in computer-readable medium 1312, RAM 1318, and/or non-volatile storage drive 1320. These instruction sets or code may be executed by the processor(s) 1314. Computer-readable medium 1312, RAM 1318, and/or non-volatile storage drive 1320 may also provide a repository to store data and data structures used in accordance with the present invention. RAM 1318 and non-volatile storage drive 1320 may include a number of memories including a main random access memory (RAM) to store instructions and data during program execution and a read-only memory (ROM) in which fixed instructions are stored. RAM 1318 and non-volatile storage drive 1320 may include a file storage subsystem providing persistent (non-volatile) storage of program and/or data files. RAM 1318 and non-volatile storage drive 1320 may also include removable storage systems, such as removable flash memory.

Bus subsystem 1316 provides a mechanism to allow the various components and subsystems of computer 1302 communicate with each other as intended. Although bus subsystem 1316 is shown schematically as a single bus, alternative embodiments of the bus subsystem may utilize multiple busses or communication paths within the computer 1302.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Whereas many alterations and modifications of the present invention will no doubt become apparent to a person of ordinary skill in the art after having read the foregoing description, it is to be understood that the particular embodiments shown and described by way of illustration are in no way intended to be considered limiting.

Moreover, the processes described above, as well as any other aspects of the disclosure, may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and optical data storage devices. In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of any one or more of any system, device, or server may be provided as a software construct, firmware construct, one or more hardware components, or a combination thereof, and may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of any one or more of any system device, or server are merely illustrative, and that the number, configuration, functionality, and interconnection of existing modules may be modified or omitted, additional modules may be added, and the interconnection of certain modules may be altered.

While there have been described systems, methods, and computer-readable media for enabling efficient control of a media application at a media electronic device by a user electronic device, it is to be understood that many changes may be made therein without departing from the spirit and scope of the disclosure. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method comprising:
   receiving, at a device part of a short-range wireless communication network, a data packet, the device including at least two radio nodes, wherein each of the at least two radio nodes are part of a concurrent transmission (CT) flooding network configured to concurrently transmit data to one or more corresponding receiving radios with corresponding radio nodes of other devices in the short-range wireless communication network;
   determining a redundancy and a throughput requirement for transmission of the data packet, wherein any of a packet fragmentation process and a packet replication process are implemented based on the redundancy and throughput requirements;
   synchronizing, across all devices configured to transmit either all or a fragment of the data packet in the short-range wireless communication network, a time for transmitting either all or the fragment of the data packet for each CT flooding network;
   distributing, for each CT flooding network, any of a set of orthogonal radio frequency channels for transmitting either all or the fragment of the data packet; and concurrently transmitting, by each of the at least two radios of the device, either all or the fragment of the data packet to corresponding receiving radios.

2. The method of claim 1, wherein the short-range wireless communication network implements a wireless communication protocol with a frequency between 2.4 and 6 gigahertz.

3. The method of claim 1, wherein the device synchronizes the times for transmitting either all or the fragment of the data packet for each CT flooding network across all devices that are configured to transmit either all or the fragment of the data packet in the short-range wireless communication network.

4. The method of claim 1, wherein the data packet comprises any of an internet protocol version 4 (IPv4) or an internet protocol version 6 (IPv6) data packet.

5. The method of claim 1, further comprising:
responsive to determining that the throughput requirement for transmission of the data packet exceeds a threshold, implementing the packet fragmentation process that includes:
dividing the data packet into a series of fragments; and
assigning each fragment to each CT flooding network, wherein radios that are part of each CT flooding network transmit each corresponding fragment of the data packet.

6. The method of claim 1, further comprising:
responsive to determining that the throughput requirement for transmission of the data packet does not exceed a threshold, implementing the packet replication process that includes:
replicating the data packet into a series of data packet instances, wherein radios that are part of each CT flooding network transmit each corresponding replicated instance of the data packet.

7. The method of claim 1, wherein the distribution of the set of orthogonal radio frequency channels further includes distributing the set of orthogonal radio frequency channels for each CT flooding network across each CT flooding network for each timeslot according to schedules of each CT flooding network.

8. A device comprising:
at least two radio nodes, wherein each radio is part of a concurrent transmission (CT) flooding network configured to concurrently transmit data to one or more corresponding receiving radios with corresponding radio nodes of other devices in a short-range wireless communication network; and
a controller connected to the at least two radio nodes, where the controller is operative to:
receive a data packet;
synchronize, across all other devices configured to transmit either all or a fragment of the data packet in the short-range wireless communication network, a time for devices in each CT flooding network to transmit either all or the fragment of the data packet;
distribute, for each CT flooding network, any of a set of orthogonal radio frequency channels for transmitting either all or the fragment of the data packet;
perform one of:
fragmenting the data packet into a set of fragments, wherein each fragment is to be transmitted by each CT flooding network via a packet fragmentation process; or
replicating the data packet for transmission across each CT flooding network via a packet replication process; and send an instruction to the at least two radio nodes to concurrently transmit, by each of the at least two radios of the device, either all or the fragment of the data packet to corresponding receiving radios at corresponding frequency channels and at the time specified for each corresponding CT flooding network.

9. The device of claim 8, wherein the controller is further operative to:
determine a redundancy and a throughput requirement for transmission of the data packet, wherein any of the packet fragmentation process and the packet replication process are implemented based on the redundancy and throughput requirements.

10. The device of claim 9, wherein the controller is further operative to:
responsive to determining that the throughput requirement for transmission of the data packet exceeds a threshold, implement the packet fragmentation process including:
dividing the data packet into a series of fragments; and
assigning each fragment to each CT flooding network, wherein radios part of each CT flooding network transmit each corresponding fragment of the data packet.

11. The device of claim 9, wherein the controller is further operative to:
responsive to determining that the throughput requirement for transmission of the data packet does not exceed a threshold, implement the packet replication process including:
replicating the data packet into a series of data packet instances, wherein radios part of each CT flooding network transmit each corresponding replicated instance of the data packet.

12. The device of claim 8, wherein the short-range wireless communication network includes a network implementing a Bluetooth or Bluetooth low energy (BLE) wireless communication protocol.

13. The device of claim 8, further comprising:
a host interface comprising a physical layer interface to communicate with the at least two radios, wherein the instruction is sent to the at least two radios via the host interface to interface with the at least two radios.

14. The device of claim 8, further comprising:
a multi-radio CT flooding stack part of a medium access control (MAC) layer of the device.

15. A non-transitory computer-readable storage medium containing program instructions for a method being executed by an application, the application comprising code for one or more components that are called by the application during runtime, wherein execution of the program instructions by one or more processors of a computer system causes the one or more processors to perform steps comprising:
receiving a data packet, wherein either all or a portion of the data packet is configured to be transmitted by each of at least two radios to a receiving radio node, wherein each of the at least two radios are part of a concurrent transmission (CT) flooding network configured to concurrently transmit all or the portion of the data packet with corresponding radio nodes of other devices;
performing one of:
fragmenting the data packet into a set of fragments, wherein each fragment is to be transmitted by each of a series of CT flooding networks via a packet fragmentation process; or replicating the data packet for transmission across each CT flooding network via a packet replication process;

determining, for each CT flooding network for the at least two radios, a time for transmitting either all or the portion of the data packet and a selected orthogonal radio frequency channel of a set of orthogonal radio frequency channels; and concurrently transmitting, by each of the at least two radios, either all or the portion of the data packet to the corresponding receiving radio nodes at the time for transmitting and at the selected orthogonal radio frequency channel for each CT flooding network.

16. The non-transitory computer-readable storage medium of claim 15, wherein execution of the program further causes the one or more processors to perform steps comprising:

synchronizing, across all other devices configured to transmit either all or the fragment of the data packet, the times for transmitting either all or the portion of the data packet; and distributing, to the other devices configured to transmit either all or the fragment of the data packet, each of the set of orthogonal radio frequency channels for each CT flooding network to transmit either all or the fragment of the data packet.

17. The non-transitory computer-readable storage medium of claim 15, wherein the time for transmitting either all or the portion of the data packet and the selected orthogonal radio frequency channel of a set of orthogonal radio frequency channels is obtained from another device configured to transmit either all or the fragment of the data packet.

18. The non-transitory computer-readable storage medium of claim 15, wherein execution of the program further causes the one or more processors to perform steps comprising:

determining a redundancy and a throughput requirement for transmission of the data packet, wherein any of the packet fragmentation process and the packet replication process are implemented based on the redundancy and throughput requirements;

responsive to determining that the throughput requirement for transmission of the data packet exceeds a threshold, implementing the packet fragmentation process including:

dividing the data packet into a series of fragments; and assigning each fragment to each CT flooding network, wherein radios part of each CT flooding network transmit each corresponding fragment of the data packet; and responsive to determining that the throughput requirement for transmission of the data packet does not exceed a threshold, implementing the packet replication process including:

replicating the data packet into a series of data packet instances, wherein radios that are part of each CT flooding network transmit each corresponding replicated instance of the data packet.

19. The non-transitory computer-readable storage medium of claim 15, wherein either all or the portion of the data packet is transmitted from the at least two radios to corresponding receiving radio nodes over a short-term wireless communication network, wherein the short-term wireless communication network implements a wireless communication protocol with a frequency between 2.4 and 6 gigahertz.

20. The non-transitory computer-readable storage medium of claim 15, wherein each CT flooding network transmits data via a frequency-modulated wireless communication protocol.

* * * * *